INVENTOR.
Hubert P. Barringer
BY
ATTORNEY.

United States Patent Office 3,306,681
Patented Feb. 28, 1967

3,306,681
DAMPED BEARING FOR CENTRIFUGES
Hubert P. Barringer, Oak Ridge, Tenn., assignor to the United States of America as represented by the United States Atomic Energy Commission
Filed Aug. 7, 1964, Ser. No. 388,336
4 Claims. (Cl. 308—140)

The present invention relates to centrifuges and like rotating devices, and more particularly to such devices having novel and improved means for damping vibration forces occurring during the operation thereof.

The present invention is broadly applicable to bowl-type centrifuges, but for simplicity will be described as adapted for use with an intermediate speed zonal-type centrifuge rotor commonly referred to as a B–II rotor, mode by Spinco Division of Beckman Instruments, Inc. The B–II rotor is designed for the liquid phase separation of biological materials; liquid can be admitted to and withdrawn from the rotor during operation. The construction and operation of the B–II rotor is described in a special report, ORNL–3415, dated March 4, 1963, pages 39–48.

The B–II rotor was designed for operation at a speed of 40,000 r.p.m. The B–II rotor is provided at its top with an axially extending shaft. The rotor bottom is recessed to receive a shaft which is connected, through a flexibly mounted transmission system, to a suitable drive means. As originally designed, the upper shaft was mounted in a journal bearing which was provided with small amounts of damping. The damping was accomplished by flexing an elastomeric bushing which also formed a vacuum seal between the bearing and the centrifuge vacuum chamber.

In tests, the above B–II rotor exhibited marked instability at comparatively low speeds. For example, a filled rotor having thirty-six septa was found to be so unstable at speeds in the range of 25,000 to 35,000 r.p.m. that it was necessary to impose a speed limitation of 25,000 r.p.m. on the system. Subsequent tests have established that the above rotor exhibited a characteristic precessional instability having a frequency in the range of 100 to 140 c.p.s. and a peak-to-peak amplitude well in excess of 0.120″ in the unstable range.

Various efforts have been made to reduce the instability of the B–II rotor. Little or no improvement was achieved by adding more damping to the lower rotor system, by mounting the transmission system on isolators, or by making minor modifications to the top bearing. However, there is one system in which the instability of the B–II rotor has been virtually eliminated. This was accomplished by a top damper-and-bearing system utilizing two spaced concentric bellows, a viscous oil being confined in the space therebetween. The upper shaft of the rotor extended freely through the inner bellows and was journaled in a bearing supported by the inner bellows. This kind of system is described in a special report, ORNL–3502, issued October 11, 1963, pages 34–36.

The bellows damping system mentioned above had several disadvantages. First, during normal operation the inner bellows is subjected to a low-amplitude, high-frequency vibration. This raises the question of whether the bellows will withstand long-term operation, and makes necessary an investigation of the fatigue characteristics of the bellows. Second, the bellows system can be damaged easily during installation or servicing. Third, the damping constant of the bellows system is non-linear, since the damping force varies approximately as the square of the velocity of the bellows movement.

With a knowledge of the limitations of prior damping systems for centrifuges, it is a primary object of this invention to provide an improved damped bearing arrangement for the upper shaft of a centrifuge bowl to damp potentially damaging rotor movements in the lateral direction, to accommodate slight movements of the rotor in the axial direction, and to accommodate slight bending of the upper shaft.

It is another object of the present invention to provide a sealed damped bearing arrangement which is compact and rugged and whose damping characteristics can be varied with relative ease.

It is another object of the present invention to provide a cooled and lubricated journal bearing which is adapted to oscillate to accommodate slight bending of the rotor shaft.

It is still another object of the present invention to provide a bearing-damping system characterized by virtually linear damping of lateral movements of the rotor shaft and also by a comparatively low spring rate permitting small radial or axial movements of the rotor shaft.

These and other objects and advantages of the present invention will become apparent upon a consideration of the following detailed description and the accompanying drawing, wherein.

The above objects have been accomplished in the present invention by providing a self-aligning spherical bearing arrangement pivotally mounted to provide a self-aligning feature, and a vibration damping ring attached to the outer race of the spherical bearing, said ring having outwardly extending lateral projections which cooperate with inwardly extending lateral projections attached to a base member to provide linear damping by a shearing action of an oil layer disposed between the cooperating lateral projections. Sealing means are provided to maintain a damping oil around the ring and between the overlapping lateral projections.

Figure 2:
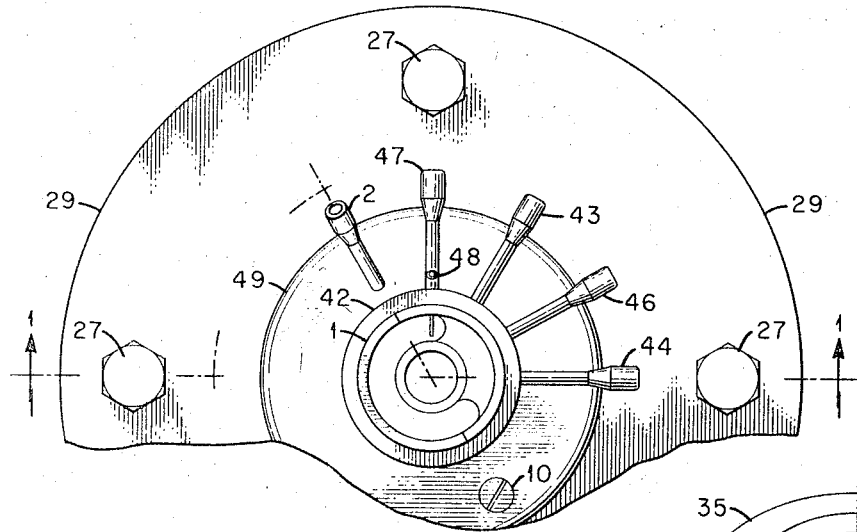
FIG. 2 is a top plan view of the arrangement of FIG. 1.
Figure 1:
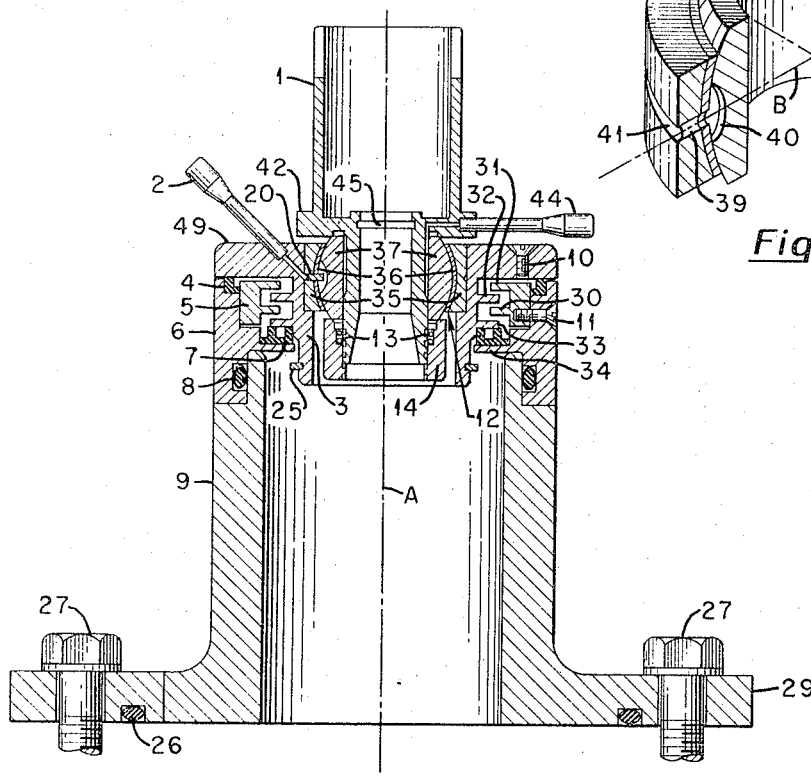
FIG. 1 is a longitudinal, central sectional view of the damped, upper bearing arrangement for a centrifuge shaft.

In the drawing, the arrangement shown in FIG. 1 and FIG. 2 includes a tubular aluminum support 9 which is provided with an external basal flange 29 adapted to be sealably secured to the top of a stationary housing for a B–II rotor by means of bolts 27 and a sealing ring 26. The interior of the stationary housing is normally evacuated to a low pressure. The top end of the support 9 is grooved peripherally for supportably and sealably engaging the lower portion of an aluminum ring 6 by means of a sealing gasket 8. The ring 6 is provided with a medial flange 34 which extends inwardly beyond the top of the support 9 to define an annular opening. Fitted within and bolted to the ring 6 by means of a screw 11 is an annular aluminum insert 5 having medial and top internal flanges 30 and 31, respectively. The top face of the ring 6 is grooved for reception of an elastomeric sealing ring 4 which is L-shaped in cross section. The upwardly extending portion of the sealing ring 4 extends somewhat above the ring 6 to resiliently support a top external flange 49 of a stainless steel bearing retainer 3. The sealing ring 4 is bonded to the ring 6 and to the flange 49.

The bearing retainer 3 is a tubular member formed with three external flanges—the above-mentioned top flange 49, and upper and lower medial flanges 32 and 33, respectively. The upper medial flange 32 extends between flanges 30 and 31 of the insert 5. The insert 5 is fabricated in the form of two semicircles to permit assembly about the retainer 3, in flange-overlapping relation. The lower medial flange 33 extends adjacent to the lower face of flange 30 of the insert 5.

The top flange 49 of bearing retainer 3 extends adjacent to the upper face of flange 31 of the insert 5. A predetermined small axial clearance, for example $\frac{1}{32}$ inch, is provided between adjacent flanges 49–31, 31–32, 32–30, and 30–33, and a somewhat larger radial clearance is provided between flanges 30, 31, and the retainer 3. The bearing retainer flange 33 is resiliently supported by an elastomeric sealing ring 7 which is mounted on flange 34 of aluminum ring 6. The sealing ring 7 is bonded to members 33 and 34.

The lower end of the retainer 3 is provided with an external circumferential groove for reception of a snap ring 25 which projects outward sufficiently to engage the flange 34 if the retainer is moved upward excessively during assembly or disassembly. This avoids the possibility of tearing loose the bonded elastomeric rings.

It will be apparent from the foregoing that the resilient mounting of the bearing retainer 3 permits limited lateral or axial movement of the retainer. It will also be apparent that the retainer 3 and the aluminum ring 6 define a leak-tight annular chamber. Leakage is prevented through the screw closures by providing thin gaskets, not shown, under the heads of the screws 10, 11. The above-mentioned annular chamber is normally filled with a viscous oil whose primary function is to damp lateral movement of the retainer 3. The damping is accomplished primarily by shearing of the oil layer disposed between static flanges 30, 31 and adjacent laterally moving flanges 32, 33, 49. Oil-shear damping is linear, being characterized by a constant damping coefficient. Linear damping is desirable from the design standpoint because a constant damping coefficient facilitates mathematical analysis. In addition to the damping just described, a negligible amount of nonlinear damping results from dragging the retainer 3 through the viscous oil.

The upper end of the retainer 3 is counterbored for snug reception of the outer race of a spherical bearing 12. The bearing, as well as all of the major components of the damped bearing arrangement, is mounted to be coaxial with the axis of rotation of the centrifuge rotor, not shown. This axis is designated as A in FIG. 1. As shown in detail in FIG. 3, the bearing 12 consists of an outer race 35, an insert 36, and a ball or ring 37. The race 35 is provided with an external circumferential groove 41, which communicates with the exterior of the ball 37 by means of an oil hole 39 which extends through the outer race 35 and the insert 36, as shown. The bearing 12 is of conventional design with two exceptions: (1) the exterior wall of the ball is provided with a centrally located, transverse groove 40; (2) a pin 20 (FIG. 1) is slidably mounted in the oil hole 39 to extend within the groove 40. The pin-and-groove arrangement just described prevents rotation of the ball 37 about the rotor axis A, but permits limited oscillation of the ball.

Figure 3:
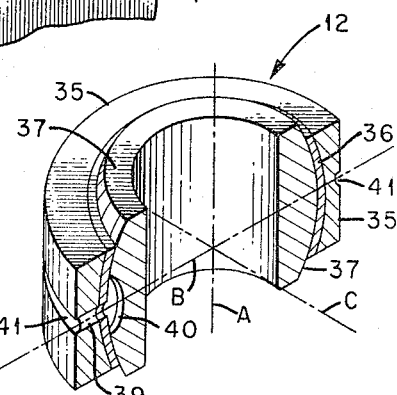
FIG. 3 is a transverse, central sectional view of the spherical bearing incorporated in the arrangement of FIG. 1.

Referring to FIG. 3, the movement referred to herein as oscillation can be defined by considering three mutually perpendicular axes—the rotor axis A, the axis B of the pin 20, and a horizontal axis C. The term oscillation refers to pivotal movement of the ball about the axis B, or about the axis C, or to a combination of these movements. The length of the aforementioned groove 40 limits the extent of movement about the axis C.

Normally, the bearing 12 is lubricated with oil which is fed under slight pressure to the lubricating groove 41 by means of an external tube 2 inserted in a bore provided in the bearing retainer flange 49. This bore communicates with the groove 41 and with the groove 40 through the oil hole 39, the aforementioned pin 20 being preferably formed with a flat side to promote the flow of the oil. The oil in the lubricating groove 41 flows across the face of the ball 37, both outwardly toward atmosphere and inwardly toward vacuum. Thus, the oil also serves to seal against the inleakage of atmospheric gases through the bearing.

As shown in FIG. 1, a tubular bronze insert 1 is fitted snugly in the ball 37. The insert is coaxial with the bearing 12 and extends both above and below it. That part of the insert 1 which is encompassed by the ball 37 is adapted to serve as a journal bearing for the upper shaft of the centrifuge rotor, not shown. It should be noted that the ball 37 extends somewhat beyond the top and bottom faces of the bearing insert 36 and the outer race 35. The insert 1 is formed with an external flange 42 which rests on, and extends radially beyond, the ball 37. The lower end of the insert 1 is threaded externally for engagement with a nut 14 which normally is tightened to bear against the bottom face of the ball 37, bringing the above-mentioned flange 42 into tight engagement with the top face of the ball 37. Suitable sealing rings are interposed between the insert 1 and the nut 14, as well as between the flange 42 and the ball 37. It will be noted that there is sufficient spacing between the flange 42 and the retainer 3 to permit oscillation of the assembly consisting of components 12, 1.

Insert 1 is used both as the journal bearing for the centrifuge shaft and as a housing for a rotating fluid seal such as described in patent application Serial No. 357,338, filed April 3, 1964, now Patent No. 3,292,937, issued December 20, 1966. The fluid seal is mounted within the upper portion of the insert 1, above the journal bearing.

As shown in FIG. 1, the exterior of the journal bearing is provided with a channel for the flow of liquid coolant. The coolant is introduced and withdrawn through external tubes 43 and 44, which communicate with the coolant channel by means of bores provided in the flange 42. A similar arrangement is employed to supply a lubrication groove 45 in the journal bearing with oil from an external tube 46 (FIG. 2). An external drain tube 47 having a small standpipe 48 also is inserted in the flange 42 and connects with the upper portion of the insert 1. The tube 47 is provided to drain oil overflow from the journal bearing and any liquid outleakage from the rotating fluid seal assembly mounted in the upper portion of insert 1.

As designed for use with the B–II rotor, the damped bearing arrangement of FIG. 1 utilizes 1200-centistoke oil as the damping medium. The capacity of the damping chamber is 6 cc. The radial spring of the damping arrangement is 550 pounds per inch. The axial deflection of the bearing retainer assembly due to the differential pressure across it (atmospheric pressure to vacuum) is on the order of 0.024 inch.

The damping arrangement of the present invention has been tested extensively with B–II rotors. The arrangement has successfully damped rotor vibrations, permitting satisfactory operation at the design speed of 40,000 r.p.m. Actual separation tests have demonstrated that the damping arrangement of the present invention required little maintenance, that it is sufficiently rugged for routine use, that the damping constant can be altered readily by substituting damping oils of different viscosities, and that the oil-shear damping is linear for any given damping oil. The spherical joint permits the journal bearing to be self-aligning and maintains an adequate vacuum seal. Mounting of a rotating fluid seal such as described in the above-mentioned application, Patent No. 3,292,937, in the upper part of insert 1 maintains the upper (static) element of the seal in virtually exact alignment with the rotating element.

This invention has been described by way of illustration rather than limitation and it should be apparent that the present invention is equally applicable in fields other than those described.

What is claimed is:

1. A damped bearing system for supporting the upper vertically oriented shaft of a liquid-centrifuge rotor comprising in combination: a rigid support member; a journal bearing rotatably engaging said upper shaft; a spherical bearing having an inner and an outer race, said inner race being affixed to said journal bearing; means for preventing rotation of said inner race of said spherical bearing about the vertical axis of said shaft while permitting partial rotation about two mutually perpendicular, horizontally oriented axes; a damping ring having inner and outer portions, said inner portion being affixed to said outer race of said spherical bearing and provided with a plurality of lateral projections extending away from said bearing, said outer portion of said damping ring being affixed to said rigid support member and provided with a plurality of lateral projections extending between the lateral projections of said inner portion of said damping ring with a small axial clearance being provided between said respective projections, said outer portion of said damping ring further provided with a lower flange spaced from and vertically opposed to the lowermost lateral projection of said inner damping ring portion; a first elastomeric sealing means disposed between said lower flange of said outer damping ring portion and said lowermost lateral projection of said inner damping ring portion to effect a resilient seal therebetween; said inner damping ring portion further provided with an uppermost and outwardly extending flange, said outer damping ring portion being provided with an upper vertical recess vertically opposed to the outermost portion of said outwardly extending flange of said inner damping ring portion; a second elastomeric sealing means disposed within and between said recess of said outer damping ring portion and said outwardly extending flange of said inner damping ring portion to effect a resilient seal therebetween; said inner and outer portions of said damping ring together with said respective sealing means defining a leak-tight annular cavity therebetween, said cavity enclosing said lateral projections, and a viscous oil disposed within said annular cavity and between the overlapping lateral projections of said inner and outer portions of said damping ring to thus provide linear damping by a shearing action of the oil layer disposed between the cooperating, overlapping lateral projections.

2. The damped bearing system set forth in claim 1, wherein said outer race of said spherical bearing is provided with an external circumferential lubricating groove, said groove communicating through an oil hole with the exterior of said inner race and with a source of oil supply, said oil supply serving as a means to lubricate said bearing and as a sealing means for preventing flow of atmospheric gases through said bearing.

3. The damped bearing system set forth in claim 2, wherein said journal bearing is provided with an internal lubricating groove, and means for feeding oil to and from said last-named groove.

4. The damped bearing system set forth in claim 3, wherein a cooling channel is disposed between said journal bearing and said spherical bearing, and means for feeding a coolant to and from said channel.

References Cited by the Examiner
UNITED STATES PATENTS

| | | | |
|---|---|---|---|
| 913,232 | 2/1909 | Ponten | 308—146 |
| 1,953,819 | 4/1934 | Payne | 188—96.6 X |
| 2,025,787 | 12/1935 | Stahlecker et al. | 308—152 |
| 2,951,730 | 9/1960 | Rushing | 308—146 |
| 3,026,700 | 3/1962 | Bochan et al. | 210—365 |
| 3,144,280 | 8/1964 | Sorenson | 308—36.1 |

MARTIN P. SCHWADRON, *Primary Examiner.*

DAVID J. WILLIAMOWSKY, *Examiner.*

N. ABRAMS, R. F. HESS, *Assistant Examiners.*